(12) United States Patent
Cronin et al.

(10) Patent No.: US 12,341,688 B1
(45) Date of Patent: Jun. 24, 2025

(54) DEFAULT DATA STATE IN ROUTING CONTROL FUNCTIONS

(71) Applicant: Arista Networks, Inc., Santa Clara, CA (US)

(72) Inventors: David Cronin, Dundalk (IE); Sharad Birmiwal, Burnaby (CA); Rutger Antal Beltman, Dublin (IE)

(73) Assignee: ARISTA NETWORKS, INC., Santa Clara, CA (US)

( * ) Notice: Subject to any disclaimer, the term of this patent is extended or adjusted under 35 U.S.C. 154(b) by 10 days.

(21) Appl. No.: 18/588,842

(22) Filed: Feb. 27, 2024

(51) Int. Cl.
*H04L 45/42* (2022.01)
*H04L 45/02* (2022.01)

(52) U.S. Cl.
CPC .............. *H04L 45/42* (2013.01); *H04L 45/04* (2013.01)

(58) Field of Classification Search
CPC ................................ H04L 45/42; H04L 45/04
See application file for complete search history.

(56) References Cited

U.S. PATENT DOCUMENTS

| | | | | |
|---|---|---|---|---|
| 5,265,207 A | * | 11/1993 | Zak | G06F 15/17343 712/15 |
| 11,323,357 B1 | * | 5/2022 | Mahadevan | H04L 45/24 |
| 2004/0078105 A1 | * | 4/2004 | Moon | G06Q 10/10 700/100 |
| 2011/0161076 A1 | * | 6/2011 | Davis | H04M 1/72448 704/E15.001 |
| 2023/0038824 A1 | * | 2/2023 | Mahadevan | H04L 45/12 |

* cited by examiner

*Primary Examiner* — Chris Parry
*Assistant Examiner* — Dixon F Dabipi
(74) *Attorney, Agent, or Firm* — Fountainhead Law Group, PC

(57) ABSTRACT

The present disclosure defines an "unset" data state for attributes used in RCF functions. An attribute is deemed to be unset when it has not been set via an assignment statement in an RCF function or in an execution environment outside of the RCF execution environment. The present disclosure describes mechanisms for processing expressions in an RCF function that include one or more unset attributes in a predictable manner.

20 Claims, 6 Drawing Sheets

DEFAULT DATA STATE IN ROUTING CONTROL FUNCTIONS

CROSS REFERENCE TO RELATED APPLICATIONS

The present disclosure relates to commonly owned U.S. Pub. No. US 2023/0038824 (U.S. application Ser. No. 17/392,519), entitled "Efficient Runtime Evaluation Representation, External Construct Late-binding, and Updating Mechanisms For Routing Policies," filed Aug. 3, 2021, and is incorporated herein by reference in its entirety for all purposes.

BACKGROUND

Routing policies in a network device (e.g., switch, router, etc.) can specify which network routes are programmed into its routing tables and how those routes are advertised. Users can create routing policies using tools called route maps which comprise route map commands to configure routes such as permitting or denying routes, modify routes, perform conditional actions, and so on. A common routing protocol is Border Gateway Protocol (BGP), a known and well understood protocol that is used by edge devices at the edge (entry/exit point) of a network core to exchange routing and reachability information with other edge devices (BGP neighbors) at the edge of other network cores.

Routing Control Function (RCF) is a routing policy technology that is developed and sold/licensed by Arista Networks, Inc. of Santa Clara, California. RCF is described in commonly owned U.S. application Ser. No. 17/392,519, entitled "Efficient Runtime Evaluation Representation, External Construct Late-binding, and Updating Mechanisms For Routing Policies," the content of which is incorporated herein by reference in its entirety for all purposes. RCF is a programming tool that allows the user to define functions (referred to as policy functions) to programmatically evaluate network routes for route filtering, attribute modification, and the like. Users (e.g., network or system administrators) can write policy functions that express and evaluate policies such as route filtering and attribute modification in a programmatic fashion to facilitate processing of routes. Common multi-line policy directives that may occur in multiple places in a routing policy can be replaced by discrete RCF policy functions to improve readability, support, and maintenance. RCF can be used with protocols such as Routing Information Protocol (RIP), Interior Gateway Routing Protocol (IGRP), Open Shortest Path First (OSPF), Exterior Gateway Protocol (EGP), Enhanced Interior Gateway Routing Protocol (EIGRP), Intermediate System-to-Intermediate System (IS-IS), and others.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
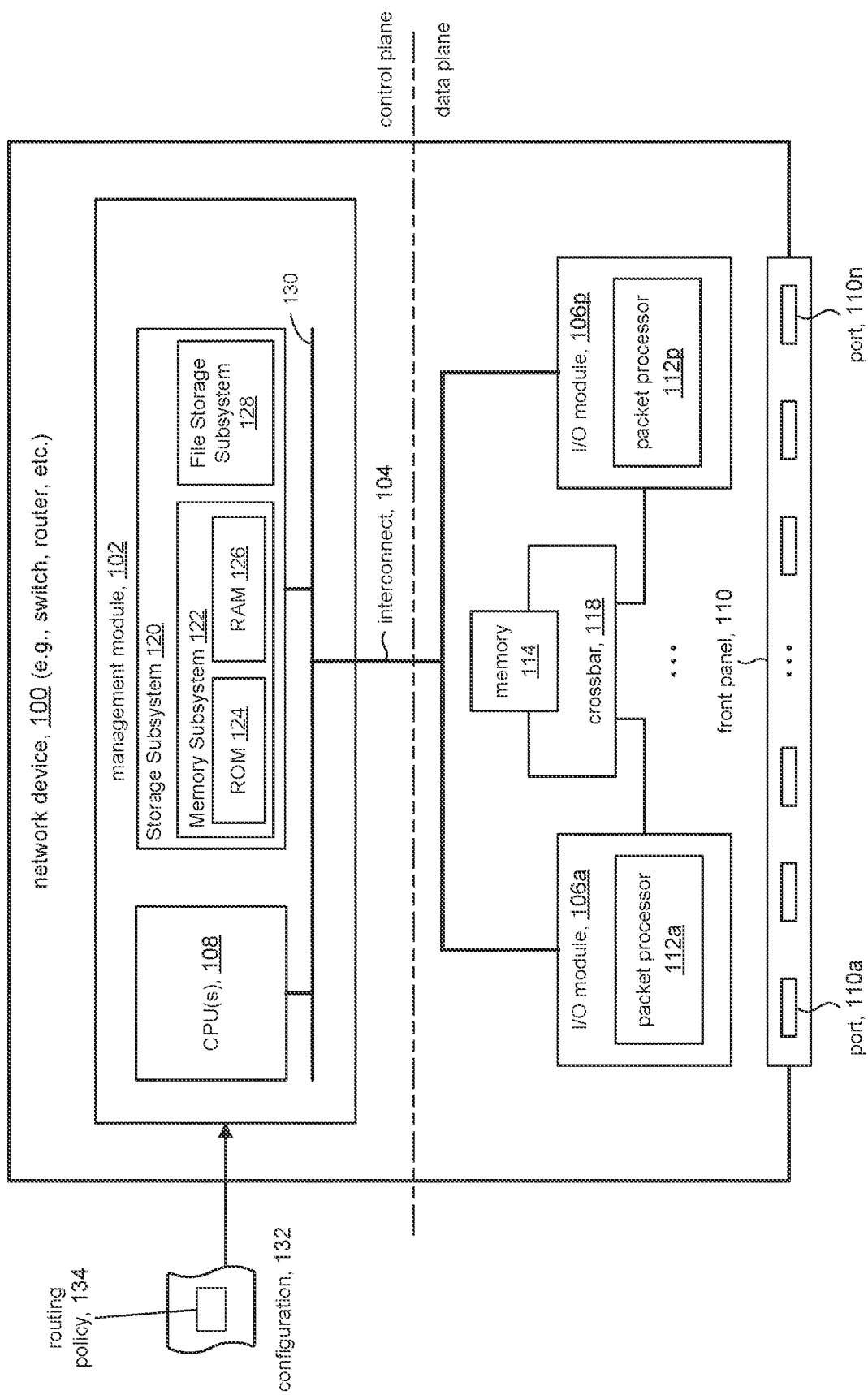
FIG. 1 is high level representation of a network device in accordance with the present disclosure.

In policy configuration languages such as RCF, a policy function can be applied at Points Of Application (POA) for different protocols. Certain route attributes may only be set with certain protocols. For example, attributes like MED and AS_PATH may be set in a BGP environment, but not in OSPF. Some attributes may only be set for certain address families (e.g., EVPN), certain route types within an address family (e.g., EVPN Type 5), and so on. Embodiments in accordance with the present disclosure allow the user to process attributes according to whether they have been set or not.

The present disclosure is directed to defining an "unset" data state for attributes used in RCF functions. An attribute is deemed to be unset when it has not been set via an assignment statement (e.g., =, +=, *=, etc.) in an RCF function or during setting up of the execution environment. Stated differently, an attribute in the unset data state indicates the attribute has not been assigned a value prior to being used.

In accordance with the present disclosure, an attribute can be initialized with a default value. In some embodiments, for example, the RCF engine can have hardcoded default values for the attributes. However, in accordance with the present disclosure, an attribute can still be deemed "unset" if the attribute has not been set to a value during run time or environment setup even though it has a default value.

Embodiments in accordance with the present disclosure define an operator that evaluates to TRUE or FALSE depending on whether an attribute is respectively set or unset.

Embodiments in accordance with the present disclosure also provide mechanisms for processing an expression in an RCF function that includes an unset attribute on the right-hand side of the expression with predictable behavior:

Embodiments in accordance with the present disclosure can no-op an expression that contains an unset attribute. Stated differently, an expression that contains an unset attribute can simply be skipped over or otherwise ignored by executing a no-operation (NOP) instruction.

An expression that contains an unset attribute can be processed with predetermined behavior, for example:

An operation that assigns an unset attribute B to an attribute A can set the attribute A to the UNSET state.

An operation that assigns an unset attribute B to an attribute A can set the attribute A to the default value of attribute A.

An operation that assigns an unset attribute B to an attribute A can set the attribute A to the default value of attribute B.

A conditional statement that includes an unset attribute can evaluate to a predetermined logic state, FALSE or TRUE.

The predetermined behavior can be user specified, for example, via the CLI or in a configuration file, etc. In some embodiments, the predetermined behavior can be specified by way of an operator (e.g., see FORCE operator below). In some instances, the predetermined behavior can be specified programmatically, for example, via a suitable program statement.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1 is a schematic representation of a network device 100 (e.g., a router, switch, firewall, and the like) that can be adapted in accordance with the present disclosure. In some embodiments, for example, network device 100 can include a management module 102, one or more I/O modules (switches, switch chips) 106a-106p, and a front panel 110 of I/O ports (physical interfaces, I/Fs) 110a-110n. Management module 102 can constitute the control plane of network device 100 (also referred to as a control layer or simply the CPU), and can include one or more management CPUs 108 for managing and controlling operation of network device 100 in accordance with the present disclosure. Each management CPU 108 can be a general-purpose processor, such as an Intel®/AMD® x86, ARM® microprocessor and the like, that operates under the control of software stored in a memory device/chips such as ROM (read-only memory) 124 or RAM (random-access memory) 126. The control plane provides services that include traffic management functions such as routing, security, load balancing, analysis, and the like.

The one or more management CPUs 108 can communicate with storage subsystem 120 via bus subsystem 130. Other subsystems, such as a network interface subsystem (not shown in FIG. 1), may be on bus subsystem 130. Storage subsystem 120 can include memory subsystem 122 and file/disk storage subsystem 128. Memory subsystem 122 and file/disk storage subsystem 128 represent examples of non-transitory computer-readable storage devices that can store program code and/or data, which when executed by one or more management CPUs 108, can cause one or more management CPUs 108 to perform operations in accordance with embodiments of the present disclosure.

Memory subsystem 122 can include a number of memories such as main RAM 126 (e.g., static RAM, dynamic RAM, etc.) for storage of instructions and data during program execution, and ROM (read-only memory) 124 on which fixed instructions and data can be stored. File storage subsystem 128 can provide persistent (i.e., non-volatile) storage for program and data files, and can include storage technologies such as solid-state drive and/or other types of storage media known in the art.

Management CPUs 108 can run a network operating system stored in storage subsystem 120. A network operating system is a specialized operating system for network device 100. For example, the network operating system can be the Arista EOS® operating system, which is a fully programmable and highly modular, Linux-based network operating system developed and sold/licensed by Arista Networks, Inc. of Santa Clara, California. It is understood that other network operating systems may be used.

Bus subsystem 130 can provide a mechanism for the various components and subsystems of management module 102 to communicate with each other as intended. Although bus subsystem 130 is shown schematically as a single bus, alternative embodiments of the bus subsystem can utilize multiple buses.

The one or more I/O modules 106a-106p can be collectively referred to as the data plane of network device 100 (also referred to as data layer, forwarding plane, etc.). Interconnect 104 represents interconnections between modules in the control plane and modules in the data plane. Interconnect 104 can be a Peripheral Component Interconnect Express (PCIe) bus or any other suitable bus architecture (e.g., System Management Bus (SMBus), Inter-Integrated Circuit (I²C), etc.).

I/O modules 106a-106p can include respective packet processing hardware comprising packet processors 112a-112p to provide packet processing and forwarding capability. Each I/O module 106a-106p can be further configured to communicate over one or more ports 110a-110n on the front panel 110 to receive and forward network traffic. Packet processors 112a-112p can comprise hardware (circuitry), including for example, data processing hardware such as an application specific integrated circuit (ASIC), field programmable gate array (FPGA), processing unit, and the like, which can be configured to operate in accordance with the present disclosure. Packet processors 112a-112p can include forwarding lookup hardware such as, for example, but not limited to content addressable memory such as ternary CAMs (TCAMs) and auxiliary memory such as static RAM (SRAMs).

Memory hardware 114 can include the buffers used for queueing packets. I/O modules 106a-106p can access memory hardware 114 via crossbar 118. It is noted that in other embodiments, the memory hardware 114 can be incorporated into each I/O module. The forwarding hardware in conjunction with the lookup hardware can provide wire speed decisions on how to process ingress packets and outgoing packets for egress. In accordance with some embodiments, some aspects of the present disclosure can be performed wholly within the data plane.

Configuration 132 can be provided to network device 100 to configure various aspects of the network device; e.g., which users can log into the device, directory name server (DNS) configuration, protocol configuration, hardware configuration, and so on. In some embodiments, configuration 132 can include routing policy 134 which represents an organization's policy for how network routes (network paths) are to be treated in the organization within which the network device is deployed; e.g., determine egress interface, virtual local area network (VLAN) tag manipulation, etc.

Figure 2:
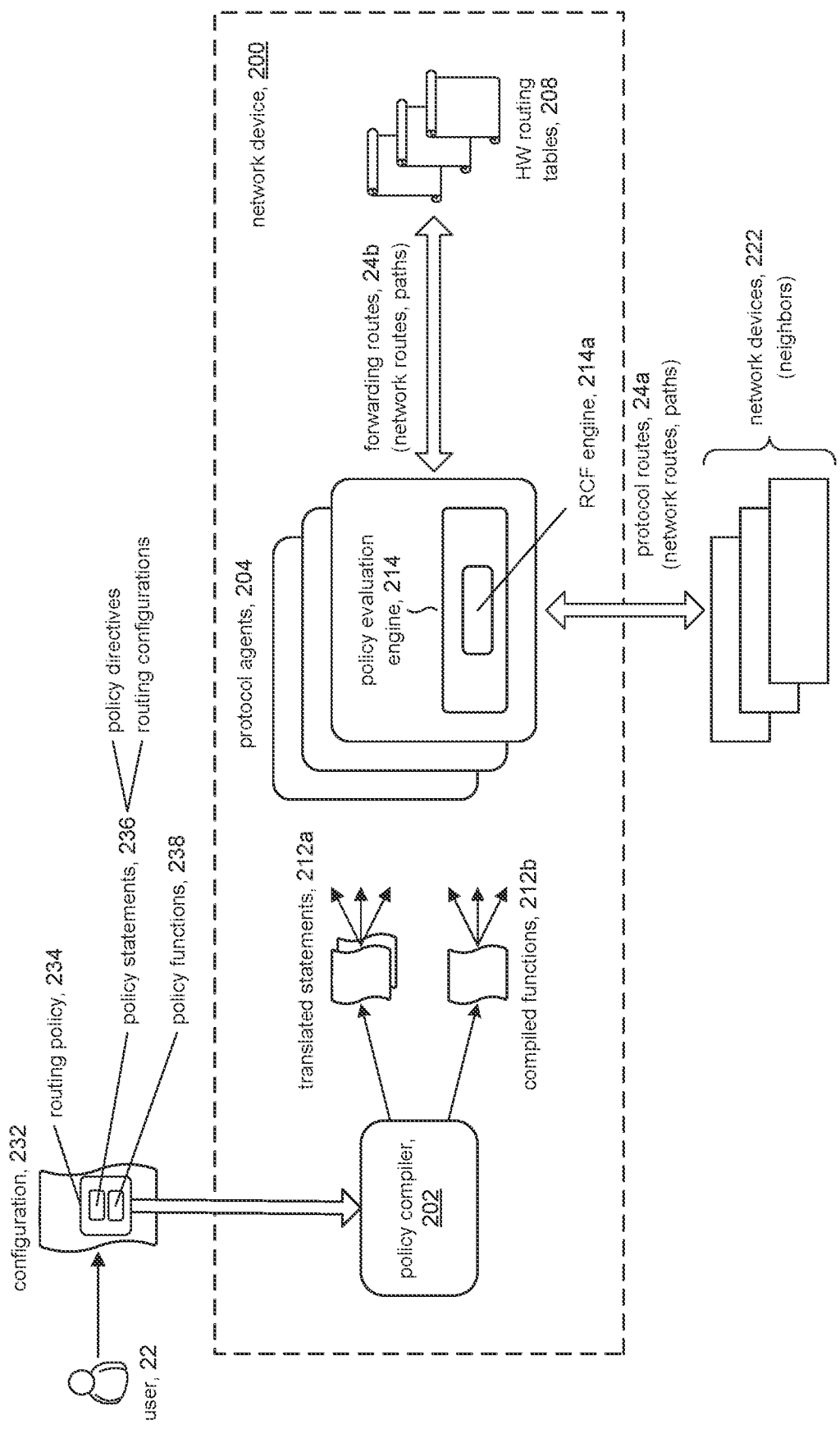
FIG. 2 represents an illustrative example of a production (live) execution environment.

FIG. 2 is a generalized schematic representation of a workflow in a network device for processing routes in accordance with the present disclosure. In some embodiments, for example, network device 200 can include policy compiler 202 to process a routing policy 234. A routing policy is used to assess or otherwise evaluate routing information that is exchanged among network devices in a network. Examples used in the present disclosure use BGP (Border Gateway Protocol) which is a gateway protocol used to exchange routing information. It will be appreciated, however, that the present disclosure can be adapted for use with other routing protocols, for example, OSPF, IS-IS, and others.

The routing policy can be defined by a network administrator and is used to assess which BGP paths received from neighbor devices can be imported into the routing table(s) of a network device and, likewise, which BGP paths stored in the routing tables of the network device can be exported from the routing tables to neighbor devices.

In accordance with some embodiments, a routing policy 234 can include functions defined using the RCF programming language. Routing policy 234 can be contained in configuration file 232 which, for example, can be provided by a user 22, a centralized network controller, etc. Policy compiler 202 can include one or more components to compile or otherwise translate the user-readable text that constitutes routing policy 234 to a suitable internal representation that the network device can execute. A policy compiler in accordance with some embodiments is disclosed in commonly owned U.S. Pub. No. US 2023/0038824, entitled "Efficient Runtime Evaluation Representation, External Construct Late-binding, and Updating Mechanisms For Routing Policies," which is incorporated herein by reference for all purposes. Routing policy 234 can include routing policy statements 236 (e.g., policy directives, routing configurations, etc.) and routing control functions (referred to herein as policy functions) 238. In some embodiments, policy compiler 202 can include a translator to produce a suitable internal representation of the human-readable policy statements 236, and is generically represented in FIG. 2 as translated statements 212a, which can be executed by the network device.

In accordance with some embodiments, policy functions 238 can be written in the RCF programming language. Users (e.g., network or system administrators) can write policy functions that express and evaluate policies such as route filtering and attribute modification in a programmatic fashion to facilitate processing of routes. Policy compiler 202 can include a compiler to produce a suitable internal representation of policy functions 238, represented in FIG. 2 as compiled functions 212b (e.g., evaluation trees).

Network device 200 can include protocol agents 204 (e.g., Spanning Tree Protocol, Address Resolution Protocol, Border Gateway Protocol, etc.) that communicate with other network devices 222 (neighbors, peers, etc.) to exchange (import and export) protocol routes (or paths) 24a. Protocol agents 204 can execute the translated statements 212a and compiled functions 212b to assess or otherwise evaluate protocol routes 24a received from BGP neighbors 222 to be programmed (imported) in the hardware routing tables 208 of the network device as forwarding routes or paths 24b. Conversely, the protocol agents 204 can assess forwarding routes 24b stored in the hardware routing tables 208 to be advertised (exported) to BGP neighbors 222. Hardware routing tables 208 can comprise any suitable persistent memory, such as TCAMs, SRAMs, etc. As used herein "route" and "path" will be used interchangeably.

Each policy agent 204 can include a policy evaluation engine 214. During processing of a received route 24a, 24b, the translated statements 212a and compiled functions 212b that constitute the routing policy are executed by the policy evaluation engine 214 to determine whether to accept (import) the received route or advertise (export) the received route. For example, routes 24a received from a neighbor device 222 can be assessed to determine if the received route is allowed to be imported (e.g., programmed) in a forwarding table of network device 200. Conversely, a route 24b in a forwarding table of the network device can be assessed to determine if the route can be exported (e.g. advertised) to neighbor devices 222. Policy evaluation engine 214 can create or otherwise represent an execution environment within which to execute the translated statements and compiled functions.

In accordance with some embodiments, the policy evaluation engine 214 can include or otherwise instantiate an RCF engine 214a that creates or otherwise represents an RCF execution environment for executing compiled functions 212b. The nature of the RCF execution environment depends on the nature of the particular implementation of RCF. In some embodiments, for example, RCF can be an interpreted language, not unlike the BASIC programming language, and RCF engine 214a can be an interpreter that interprets human-readable policy functions directly without compiling the functions. In other embodiments, RCF can be a partially compiled language. For example, policy functions can be compiled into an intermediate representation (e.g., bytecode) and RCF engine 214a can be an interpreter that interprets the intermediate representation. In some embodiments, the internal representation can be expressed as an evaluation tree, such as disclosed in commonly owned U.S. Pub. No. US 2023/0038824. In other embodiments, RCF can be compiled into binary code and RCF engine 214a can be a virtual machine that executes the binary code.

Figure 3:
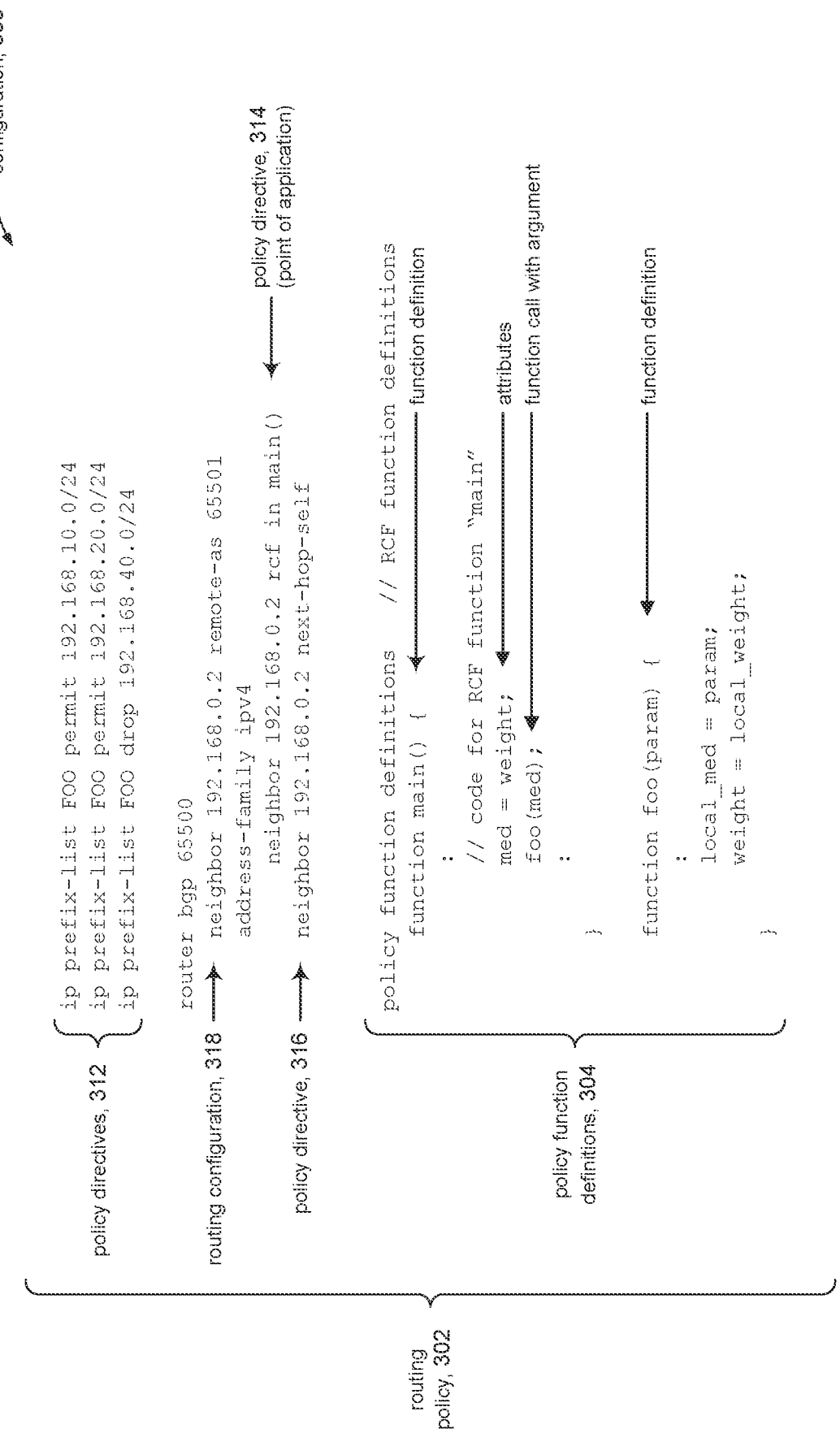
FIG. 3 is an illustrative example of a routing policy.

FIG. 3 shows a portion of a configuration 300 that includes a simplified example of a BGP routing policy 302 in accordance with some embodiments. The routing policy 302 can comprise policy statements such as policy directives 312, 314, 316, routing configuration 318, and the like. As can be seen in FIG. 3, the policy directive 314 invokes a policy function called MAIN( ) A policy directive (e.g., 314) that invokes a policy function can be referred to as the "point of application" of the policy function. When policy function MAIN( ) is encountered at a point of application during execution (evaluation) of routing policy 302, the policy function is invoked and processing of the routing policy continues within the policy function; in other words, execution transfers to the policy function. When execution of MAIN( ) completes, processing can resume at the point in the routing policy that follows the point of application 314 (i.e., execution transfers to the point in the routing policy that follows the point of application), which in the example in FIG. 3 is policy directive 316. Routing policy 302 can include a policy function definition section 304 comprising definitions of policy functions, which in the example in FIG. 3 includes function definitions for MAIN( ) and FOO( ).

RCF functions include operations that read attribute data objects (attributes) and operations that modify attributes. An attribute can be a characteristic or property of a route. For example, attributes of a BGP path include Origin, AS_Path, and Next_Hop, and so on; e.g., FIG. 3 shows route attributes MED and WEIGHT. An attribute can be a characteristic or property of the network device; for example, Device_AS_Number refers to the AS number of the network device itself. The device AS number can be appended to the AS_Path attribute of a BGP path. An attribute can refer to parameters of a function definition; e.g., the function FOO( ) in FIG. 3 is defined with a parameter PARAM. Attributes can be local variables defined within a function (e.g., the function FOO( ) in FIG. 3 uses local variables LOCAL_MED, LOCAL_WEIGHT), and so on.

Operations can be used with different kinds of attributes. FIG. 3 illustrates some examples. For instance, the expression "med=weight" in the function MAIN( ) in FIG. 3 represents an example of a route attribute (WEIGHT) that is read and a route attribute (MED) that is written. The expression "local_med=param" in the function Foo ( ) in FIG. 3 represents an example of a function parameter (PARAM) that is read and a local variable (LOCAL_MED) that is written. The expression "weight=local_weight" in the function FOO( ) in FIG. 3 represents an example of a local variable (LOCAL_WEIGHT) that is read and a route attribute (WEIGHT) that is written.

Attributes can be used with different assignment operators, in addition to the simple assignment operator "=". Following is a non-exhaustive list of example operators:

= simple assignment; C=A+B will assign the value of A+B to C, where A, B, and C are attributes as described above += ADD and assign; C+=A is equivalent to C=C+A −= SUBTRACT and assign; C−=A is equivalent to C=C−A

*= MULTIPLY and assign; C*=A is equivalent to C=C*A

/= DIVIDE and assign; C/=A is equivalent to C=C/A

%= MODULUS and assign; C %=A is equivalent to C=C % A

<<= LEFT SHIFT and assign; C<<=A is equivalent to C=C<<A

>>= RIGHT SHIFT and assign; C>>=A is equivalent to C=C>>A

&= BITWISE AND and assign; C &=A is equivalent to C=C & A.

^= BITWISE OR and assign; C ^=A is equivalent to C=C^ A

|= BITWISE INCLUSIVE OR and assign; C|=A is equivalent to C=C|A

As noted above, a policy function can be applied at Points Of Application (POAs) for different protocols. Certain route attributes may only have meaning with certain protocols. For example, attributes like MED and AS_PATH are meaningful with BGP, but not in OSPF. Some attributes may only have a meaning for certain address families (e.g., EVPN), certain route types within an address family (e.g., EVPN Type 5), and so on.

In accordance with the present disclosure, attributes can be associated with a SET and UNSET data state indication to control how an attribute is processed. Embodiments in accordance with the present disclosure allow the user to process attributes according to whether they have been set or not.

Figure 4:
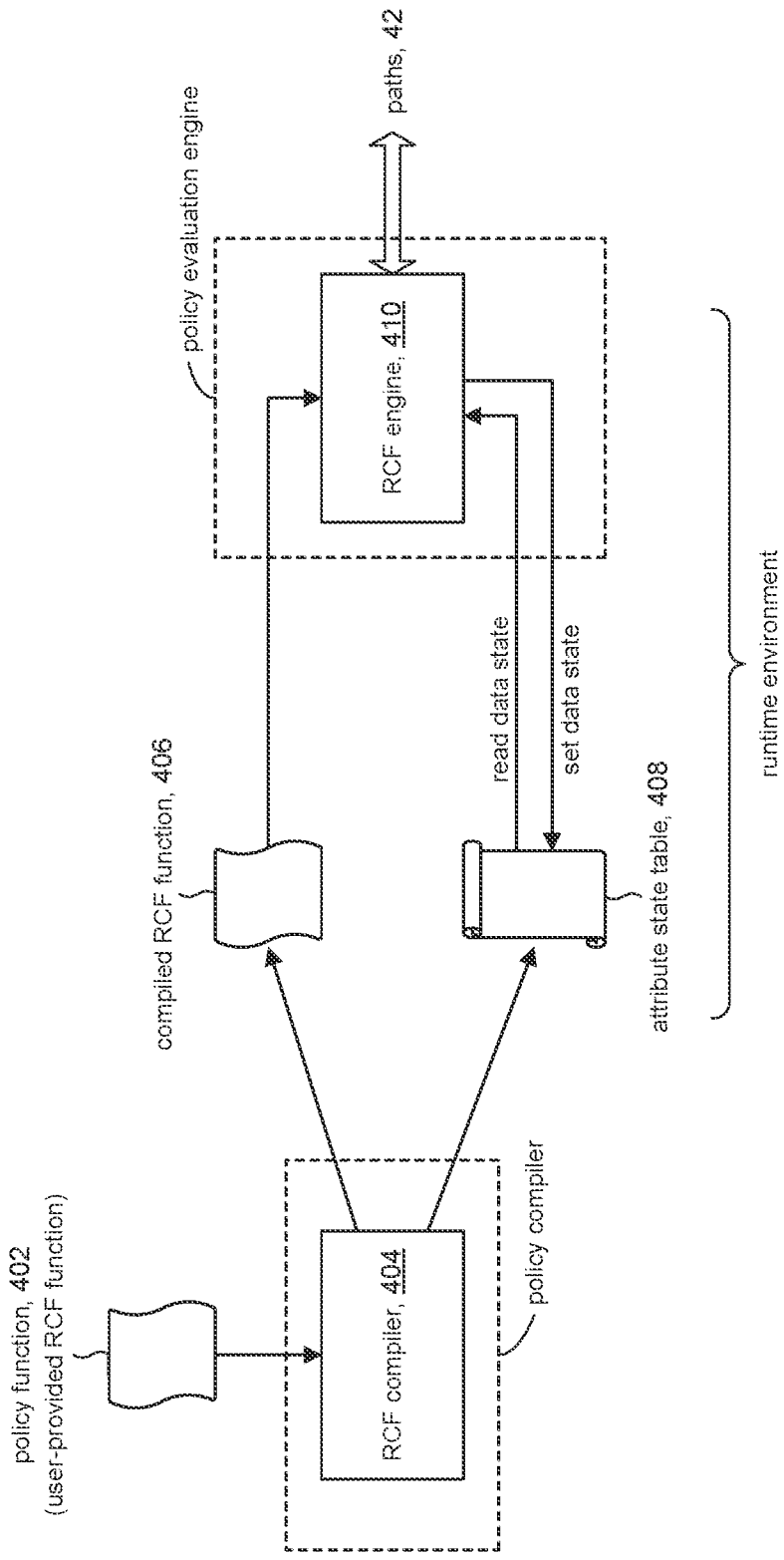
FIG. 4 illustrates additional details of compiling an RCF function in accordance with some embodiments of the present disclosure.

FIG. 4 represents an illustrative runtime (execution, evaluation) environment for managing the SET and UNSET data state of attributes in accordance with some embodiments of the present disclosure. A policy function (e.g., RCF program) 402 can be compiled by an RCF compiler 404. In some embodiments, for example, the RCF compiler 404 can be a component in the policy compiler 202 shown in FIG. 2. The RCF compiler 404 can generate a compiled RCF function 406 that can be executed by RCF engine 410 to evaluate network routes 42. In some embodiments, for example, the RCF engine 410 can be a component in the policy evaluation engine 214 shown in FIG. 2.

As part of the compilation process, the RCF compiler 404 can generate an attribute state table 408 comprising attributes referenced in the RCF function 402. In accordance with some embodiments, the attribute state table 408 can include set/unset data state information for attributes in the RCF function. Further in accordance with the present disclosure, the RCF engine 410 can access the attribute state table 408 to access the set/unset data state information of attributes encountered during execution of the compiled RCF function 406. The RCF engine 410 can process operations on attributes in the compiled RCF function based on their set/unset data state.

Figure 5:
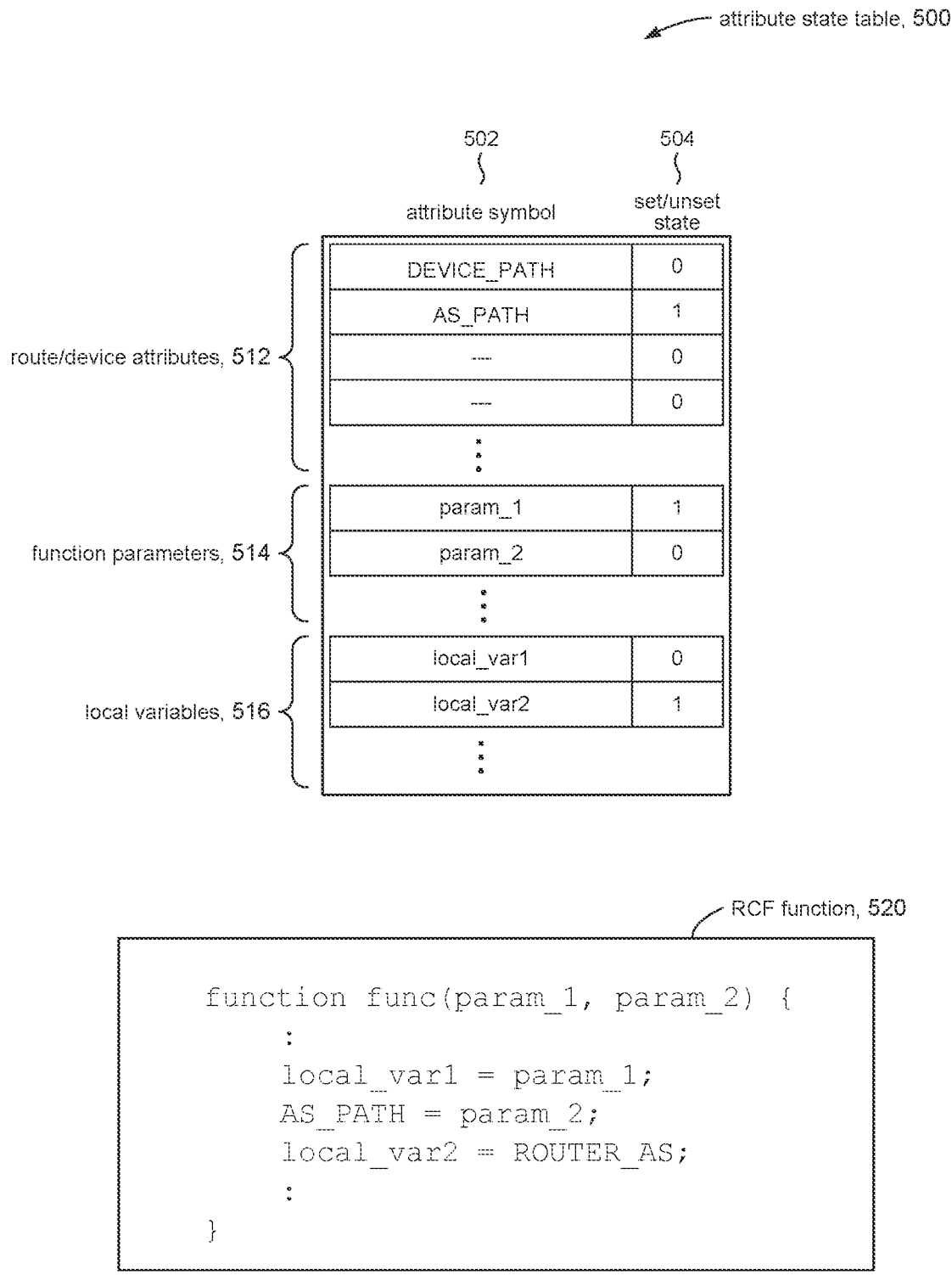
FIG. 5 represents an example of an attribute state table in accordance with some embodiments of the present disclosure.

FIG. 5 shows an illustrative representation of an attribute state table 500 in accordance with some embodiments of the present disclosure. In some embodiments, the attribute state table 500 can include entries for attributes referenced in the corresponding RCF function 520, FUNC( ) Each entry comprises an attribute symbol 502 that is an internal representation of an attribute referenced in the RCF function (e.g., the symbols may come from the parsing stage of the compilation process), and a corresponding set/unset data state 504 (e.g., a 1-bit value) that indicates whether or not the attribute is in a SET data state or an UNSET data state.

The attribute state table 500 can comprise a group of entries 512 for route and switch attributes referenced in the corresponding RCF function 520. In some embodiments, the attribute state table can further include a group of entries 514 for parameters of the corresponding RCF function. In some embodiments, the attribute state table can further include a group of entries 516 for local variables defined in the corresponding RCF function.

In accordance with some embodiments, some attributes can be associated with default values, for example by a user via a CLI, by way of a configuration file containing default values for one or more attributes that is scanned at compile time to assign default values, and so on. In some embodiments, an attribute that is associated with a default value can nonetheless be considered in the UNSET data state.

Although not depicted in FIG. 5, in some embodiments, there can be a corresponding attribute state table for each RCF function comprising entries for attributes referenced in that RCF function. In some embodiments, global attributes (e.g., route attributes, device attributes) can be stored in an attribute state table separate from attribute state tables for local attributes (e.g., function parameters, local variables) of RCF functions.

Figure 6:
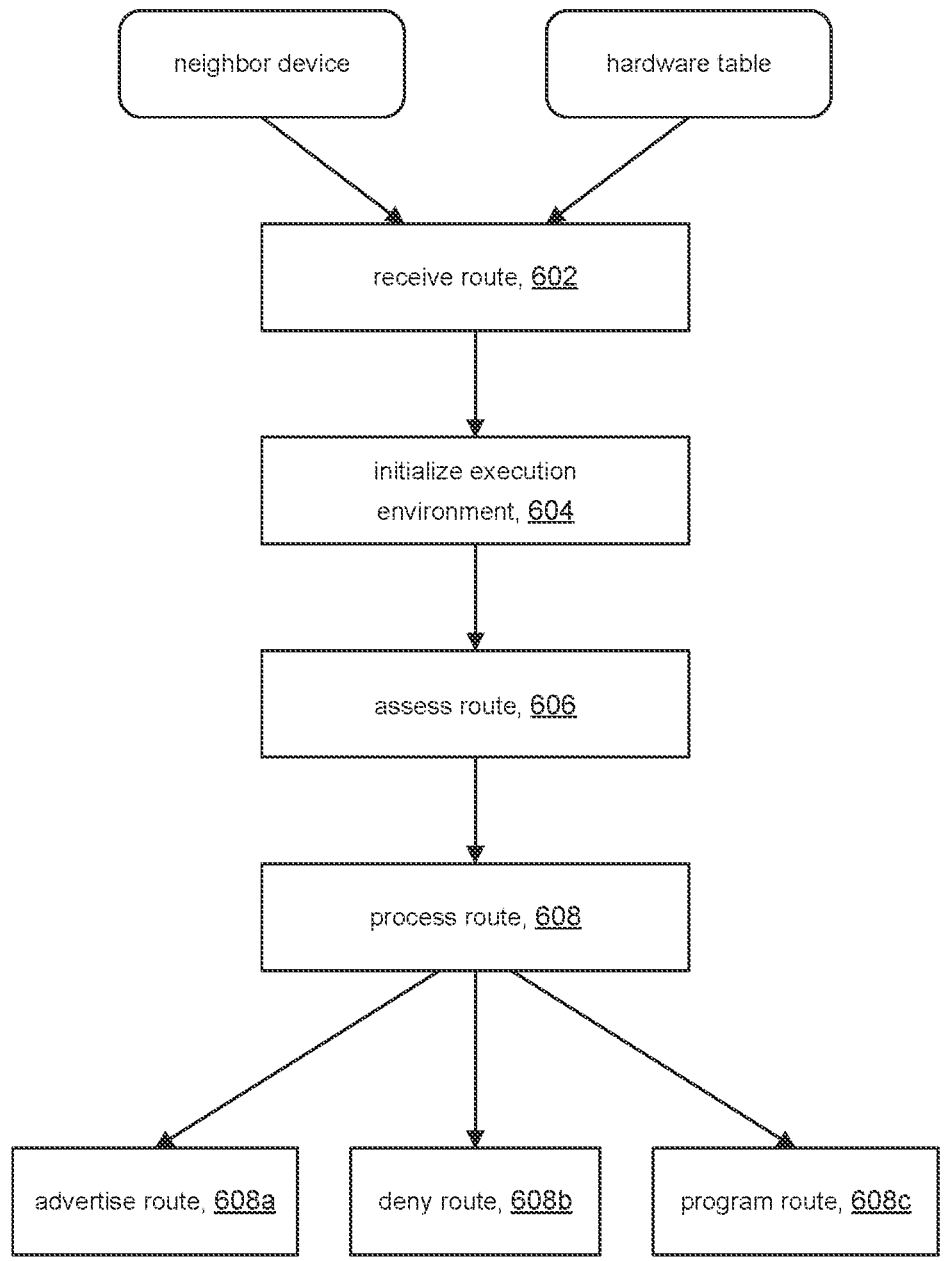
FIG. 6 represents an illustrative flow of operations for processing routes in accordance with some embodiments of the present disclosure.

Referring to FIG. 6, the discussion will now turn to a high-level description of processing by a policy evaluation engine (e.g. 214, FIG. 2) in a network device (e.g., 200) for receiving and processing a route in accordance with the present disclosure. Depending on a given implementation, the processing may be performed entirely in the control plane or entirely in the data plane, or the processing may be divided between the control plane and the data plane. In some embodiments, the network device can include one or more processing units (circuits), which when operated, can cause the network device to perform processing in accordance with FIG. 6. Processing units (circuits) in the control plane, for example, can include general CPUs that operate by way of executing computer program code stored on a non-volatile computer readable storage medium (e.g., read-only memory); e.g., CPU 108 in the control plane (FIG. 1) can be a general CPU. Processing units (circuits) in the data plane can include specialized processors such as digital signal processors, field programmable gate arrays, application specific integrated circuits, and the like, that operate by way of executing computer program code or by way of logic circuits being configured for specific operations. For example, each of the packet processors 112a-112p in the data plane (FIG. 1) can be a specialized processor. The operation and processing blocks described below are not necessarily executed in the order shown. Operations can be combined or broken out into smaller operations in various embodiments. Operations can be allocated for execution among one or more concurrently executing processes and/or threads.

At operation 602, the policy evaluation engine can receive a route. The route can come from a neighbor device (e.g., route 24a from neighbor 222), for example, in a received BGP advertisement. The route can come from a hardware routing table in the network device (e.g., route 24b from table 208) that stores network routes.

At operation 604, the policy evaluation engine can initialize the execution environment to set up data state information for executing RCF functions in accordance with the present disclosure. As explained above, one or more state attribute tables (500, FIG. 5) representing attributes referenced in the RCF functions can be generated when the RCF functions are compiled. Initializing the execution environment in accordance with the present disclosure can include:

- The set/unset data field 504 for each attribute can be initialized to the UNSET data state. Setting the data state of an attribute to the UNSET data state provides an explicit indication that the attribute has not yet been operated on as the target of an assignment operation (i.e., has not appeared on the left-hand side (LHS) of an assignment operation), nor has the attribute been initialized by the policy evaluation engine.
- Subsequent to initializing the data states of the attributes to the UNSET data state, the policy evaluation engine can initialize one or more route attributes based on characteristics or properties of the received route. For example, if the received route is a BGP path, then the AS path attribute can be set with the AS number associated with the received route.
- Subsequent to initializing one or more route attributes, the set/unset data field 504 for each of the initialized route attributes can be set the SET data state to indicate they have been set. Route attributes that have not been initialized remain in the UNSET data state.

At operation 606, the policy evaluation engine can assess or otherwise evaluate the received route by evaluating a routing policy (e.g., 302, FIG. 3). After the execution environment is initialized, the policy evaluation engine can evaluate the routing policy to assess the received route, including evaluating one or more RCF functions contained in the routing policy. Evaluation of expressions in an RCF function can be performed in accordance with the present disclosure. This aspect of the present disclosure is described in more detail below. The outcome of assessing the received route includes PERMIT or DENY.

At operation 608, the network device can process the assessed route according to an assessment outcome of the route produced by the routing policy. If the route is denied, then the network device can simply take no action on the route (operation 608b). In the case of a permitted route received from a hardware routing table in the network device, the network device can advertise (export) the route to one or neighbor devices (operation 608a), for example in a BGP path. In the case of a permitted route received from a neighbor device, the network device can program (import) the route in one of its hardware routing tables (operation 608c). Processing the assessed route can include modifying the route, modifying route attributes, and the like. Processing of the received route can be deemed complete.

Evaluation of Expressions in RCF Function

Evaluation of operations in an RCF function in accordance with the present disclosure can proceed in accordance with the following heuristics:

- In some embodiments, an operation that contains an attribute on the right-hand side (RHS) of the operator that is in the UNSET data state can simply be skipped over or otherwise ignored. Consider, for example:
  function func() {
    C +=A; .. assignment
    :
    :
  }

Because attribute A has not appeared on the left-hand side of an expression prior to the assignment statement, the attribute is in the UNSET data state (i.e., is an UNSET attribute), and the expression can be ignored.

- In some embodiments, an operation that contains an UNSET attribute can be processed with predetermined behavior other than a NOP. Consider, for example, the expression:

$A=B+C,$ where at least one of the RHS attributes (attribute B, C, or both) is UNSET. Depending on the predetermined behavior, evaluation of the expression can result in setting attribute A to one of the following:
  - the UNSET state,
  - a default value of attribute A, or
  - the expression can be evaluated using the default values of those attributes that are in the UNSET state.

The predetermined behavior can be specified by a user, for example, via the CLI or in a configuration file, etc. In some instances, the predetermined behavior can be specified programmatically, for example, via a suitable program statement.

- When the attribute on the left-hand side of an operator is set with the outcome of evaluation of the right-hand side of the operator, the data state of the LHS attribute can be set to the SET data state.

- A conditional statement that includes an UNSET attribute can evaluate to a predetermined logic state, FALSE or TRUE.

In some embodiments in accordance with the present disclosure, operators can be defined to manage the SET and UNSET state of an attribute, for example:

- !—The FORCE operator. In some embodiments, the FORCE operator (a unary operator) can enforce an evaluation outcome of its attribute operand. If the attribute is in the UNSET state, then the FORCE operator can impose the default value of the attribute as the outcome of the operation; for example:

A=B!;

The expression "B!" will evaluate to the default value of attribute B if the attribute is UNSET. The FORCE operator would not change the state of B, however; if B is UNSET before executing the expression, B would remain UNSET after the operation. Compare with the set/unset operators below.

- ?—The TEST operator, a unary operator. In some embodiments, the TEST operator can evaluate to TRUE or FALSE depending on whether the attribute is in the UNSET state or not, for example:

if B? {<statements>}

The expression "B?" can evaluate to TRUE if attribute B is in the SET state and FALSE if attribute B is in the UNSET state.

- set( ) and unset( )—These operators represent complementary operations to force the SET/UNSET state of an attribute. These operations change the data state of the attribute; for example, the statements:

set(A);
  unset(B);

will set attribute A to the SET data state and assign a default value to the attribute if attribute A is in the UNSET data state; otherwise the attribute is unchanged. Attribute B will be set to the UNSET data state if the attribute is in the set data state.

A compiler (e.g. policy compiler 202, FIG. 2) for compiling an RCF function can generate an internal representation of the RCF function. In accordance with the present disclosure, the compiler can generate auxiliary instructions for each RHS attribute in an expression. In some embodiments, for example, the auxiliary instructions for an RHS attribute can access the attribute state table (e.g. 500, FIG. 5) to determine the set/unset state of the attribute. If the attribute is in the SET data state, the auxiliary instructions can produce the value of the attribute. On the other hand, if the attribute is in the UNSET data state, the auxiliary instructions can produce a value in accordance with one of the predetermined behaviors described above. In this way, the right-hand side of the expression can be evaluated in a predictable and consistent manner despite that some of the attributes are in the UNSET data state.

Evaluating expressions in accordance with the present disclosure can provide predictable and consistent behavior when RHS attributes in an expression are accessed before having been initialized; i.e. are in an UNSET state.

FURTHER EXAMPLES

Features described above as well as those claimed below may be combined in various ways without departing from the scope hereof. The following examples illustrate some possible, non-limiting combinations:

(A1) A method in a network device for assessing network routes, the method comprising: receiving a routing policy comprising a plurality of policy directives, at least one policy directive having a point of application that specifies an RCF function; receiving a network route; assessing the network route by processing the policy directives in the routing policy, wherein processing the policy directives in the routing policy includes executing the at least one policy directive, wherein executing the at least one policy directive includes: invoking the RCF function at the point of application; executing the RCF function, including evaluating an expression that contains an attribute in an unset data state which indicates that the attribute has not been set to a value prior to evaluating the expression, wherein evaluating the expression includes evaluating the attribute in the unset state in accordance with user-specified behavior; and upon completing execution of the RCF function, continuing processing the policy directives in the routing policy to assess the network route; and performing an action on the network route based on assessment of the network route.

(A2) For the method denoted as (A1), the unset data state indicates that the attribute has not been an operand on the left-hand side of any program statement prior to evaluating the expression.

(A3) For the method denoted as any of (A1) through (A2), the user-specified behavior is specified by one of: input received by the user via a command line interface, input provided in a configuration file by the user, and a program statement that was executed prior to evaluating the expression.

(A4) For the method denoted as any of (A1) through (A3), the user-specified behavior is to not execute the expression.

(A5) For the method denoted as any of (A1) through (A4), the user-specified behavior is a SET( ) operator that sets the attribute to the SET data state and assigns a default value to the attribute.

(A6) For the method denoted as any of (A1) through (A5), the expression is an assignment statement, wherein the user-specified behavior is one of: setting a variable on a left-hand side of the expression to the unset data state, setting the variable to a default value of the unset attribute, and setting the variable on to a default value of the variable.

(A7) For the method denoted as any of (A1) through (A6), the network route is received from a routing table in the network device or from a neighbor network device.

(A8) For the method denoted as any of (A1) through (A7), the action includes importing the network route to a routing table in the network device or exporting the network route to neighbors of the network device.

(B1) A network device comprising: one or more computer processors; and a computer-readable storage device comprising instructions for controlling the one or more computer processors to: assess a network route by processing a routing policy, including executing at least one policy directive in the routing policy, wherein executing the at least one policy directive includes: invoking an RCF function at the point of application; executing the RCF function, including evaluating an expression in the RCF function that contains an attribute in an unset data state, wherein the unset data state indicates that the attribute has not been set to a value prior to evaluating the expression, wherein evaluating the expression includes evaluating the attribute that is in the unset data state according to a user-specified behavior; and upon completing execution of the RCF function, continuing processing the routing policy to assess the network route; and perform an action on the network route based on an assessment of the network route.

(B2) For the network device denoted as (B1), the network route is received from a routing table in the network device or from a neighbor network device.

(B3) For the network device denoted as any of (B1) through (B2), the action includes importing the network route to a routing table in the network device or exporting the network route to neighbors of the network device.

(B4) For the network device denoted as any of (B1) through (B3), the unset data state indicates that the attribute has not occurred on the left-hand side of any program statement prior to evaluating the expression.

(B5) For the network device denoted as any of (B1) through (B4), the user-specified behavior is to not execute the expression.

(B6) For the network device denoted as any of (B1) through (B5), the user-specified behavior is a SET( ) operator that sets the attribute to the SET data state and assigns a default value to the attribute.

(B7) For the network device denoted as any of (B1) through (B6), the expression is an assignment statement, wherein the user-specified behavior is one of: setting a variable on a left-hand side of the expression to the unset data state, setting the variable to a default value of the unset attribute, and setting the variable on to a default value of the variable.

(C1) A non-transitory computer-readable storage device in a network device, the non-transitory computer-readable storage device having stored thereon computer executable instructions, which when executed, cause the network device to: assess a network route by processing a routing policy, including executing at least one policy directive in the routing policy, wherein executing the at least one policy directive includes: invoking an RCF function at the point of application; executing the RCF function, including evaluating an expression in the RCF function that contains an attribute in an unset data state, wherein the unset data state indicates that the attribute has not been set to a value prior to evaluating the expression, wherein evaluating the expression includes evaluating the attribute that is in the unset data state according to a user-specified behavior; and upon completing execution of the RCF function, continuing processing the routing policy to assess the network route; and perform an action on the network route based on the assessed network route.

(C2) For the non-transitory computer-readable storage device denoted as (C1), the action includes importing the network route to a routing table in the network device or exporting the network route to neighbors of the network device.

(C3) For the non-transitory computer-readable storage device denoted as any of (C1) through (C2), the action includes importing the network route to a routing table in the network device or exporting the network route to neighbors of the network device.

(C4) For the non-transitory computer-readable storage device denoted as any of (C1) through (C3), the unset data state indicates that the attribute has not occurred on the left-hand side of any program statement prior to evaluating the expression.

(C5) For the non-transitory computer-readable storage device denoted as any of (C1) through (C4), the user-specified behavior is to not execute the expression.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device for assessing network routes, the method comprising:
   receiving a routing policy comprising a plurality of policy directives, at least one policy directive having a point of application that specifies a Routing Control Function (RCF) function;
   receiving a network route;
   assessing the network route by processing the policy directives in the routing policy, wherein processing the policy directives in the routing policy includes executing the at least one policy directive, wherein executing the at least one policy directive includes:
      invoking the RCF function at the point of application;
      executing the RCF function, including evaluating an expression that contains an attribute in an unset data state which indicates that the attribute has not been set to a value prior to evaluating the expression, wherein evaluating the expression includes evaluating the attribute in the unset data state in accordance with a user-specified behavior; and
      upon completing execution of the RCF function, continuing processing the policy directives in the routing policy to assess the network route; and
   performing an action on the network route based on assessment of the network route.

2. The method of claim 1, wherein the unset data state indicates that the attribute has not been used as an operand on a left-hand side of any program statement prior to evaluating the expression.

3. The method of claim 1, wherein the user-specified behavior is specified by one of: input received by a user via a command line interface, input provided in a configuration file by the user, and a program statement that was executed prior to evaluating the expression.

4. The method of claim 1, wherein the user-specified behavior is to not execute the expression.

5. The method of claim 1, wherein the user-specified behavior is a SET( ) operator that sets the attribute to a SET data state and assigns a default value to the attribute.

6. The method of claim 1, wherein the expression is an assignment statement and comprises a variable on a left-hand side of the assignment statement, wherein the user-specified behavior is one of: setting the variable to the unset data state, setting the variable to a default value of the attribute, and setting the variable to a default value of the variable.

7. The method of claim 1, wherein the network route is received from a routing table in the network device or from a neighbor network device.

8. The method of claim 1, wherein the action includes importing the network route to a routing table in the network device or exporting the network route to neighbors of the network device.

9. A network device comprising:
   one or more computer processors; and
   a computer-readable storage device comprising instructions for controlling the one or more computer processors to:
      assess a network route by processing a routing policy, including executing at least one policy directive in the routing policy, wherein executing the at least one policy directive includes:
         invoking Routing Control Function (RCF) function at the point of application;
         executing the RCF function, including evaluating an expression in the RCF function that contains an attribute in an unset data state, wherein the unset data state indicates that the attribute has not been set to a value prior to evaluating the expression, wherein evaluating the expression includes evaluating the attribute that is in the unset data state according to a user-specified behavior; and
         upon completing execution of the RCF function, continuing processing the routing policy to assess the network route; and
      perform an action on the network route based on an assessment of the network route.

10. The network device of claim 9, wherein the network route is received from a routing table in the network device or from a neighbor network device.

11. The network device of claim 9, wherein the action includes importing the network route to a routing table in the network device or exporting the network route to neighbors of the network device.

12. The network device of claim 9, wherein the unset data state indicates that the attribute has not occurred on a left-hand side of any program statement prior to evaluating the expression.

13. The network device of claim 9, wherein the user-specified behavior is to not execute the expression.

14. The network device of claim 9, wherein the user-specified behavior is a SET( ) operator that sets the attribute to a SET data state and assigns a default value to the attribute.

15. The network device of claim 9, wherein the expression is an assignment statement and comprises a variable on a left-hand side of the assignment statement, wherein the user-specified behavior is one of: setting the variable to the unset data state, setting the variable to a default value of the attribute, and setting the variable to a default value of the variable.

16. A non-transitory computer-readable storage device in a network device, the non-transitory computer-readable storage device having stored thereon computer executable instructions, which when executed, cause the network device to:
- assess a network route by processing a routing policy, including executing at least one policy directive in the routing policy, wherein executing the at least one policy directive includes:
  - invoking a Routing Control Function (RCF) function at the point of application;
  - executing the RCF function, including evaluating an expression in the RCF function that contains an attribute in an unset data state, wherein the unset data state indicates that the attribute has not been set to a value prior to evaluating the expression, wherein evaluating the expression includes evaluating the attribute that is in the unset data state according to a user-specified behavior; and
  - upon completing execution of the RCF function, continuing processing the routing policy to assess the network route; and
- perform an action on the network route based on the assessed network route.

17. The non-transitory computer-readable storage device of claim 16, wherein the action includes importing the network route to a routing table in the network device or exporting the network route to neighbors of the network device.

18. The non-transitory computer-readable storage device of claim 16, wherein the action includes importing the network route to a routing table in the network device or exporting the network route to neighbors of the network device.

19. The non-transitory computer-readable storage device of claim 16, wherein the unset data state indicates that the attribute has not occurred on a left-hand side of any program statement prior to evaluating the expression.

20. The non-transitory computer-readable storage device of claim 16, wherein the user-specified behavior is to not execute the expression.

* * * * *